United States Patent
Devenyi

(10) Patent No.: US 7,337,690 B1
(45) Date of Patent: Mar. 4, 2008

(54) LEADSCREW ASSEMBLY WITH A WIRE-WOUND LEADSCREW AND A SPRING-PIN ENGAGEMENT OF A DRIVE NUT TO THE LEADSCREW

(75) Inventor: Gabor Devenyi, Penetang (CA)

(73) Assignee: Raytheon Company, Waltham, MA (US)

( * ) Notice: Subject to any disclaimer, the term of this patent is extended or adjusted under 35 U.S.C. 154(b) by 1021 days.

(21) Appl. No.: 10/084,704

(22) Filed: Feb. 26, 2002

(51) Int. Cl.
*F16H 1/24* (2006.01)
*F16H 55/02* (2006.01)

(52) U.S. Cl. ................................. 74/424.77
(58) Field of Classification Search ............. 74/424.77, 74/89.23, 89.42, 112, 127, 424.71, 424.73, 74/424.78, 424.93
See application file for complete search history.

(56) References Cited

U.S. PATENT DOCUMENTS

| | | | | |
|---|---|---|---|---|
| 2,482,082 A | * | 9/1949 | Wahlberg | 74/424.94 |
| 2,716,352 A | * | 8/1955 | Wilson | 74/89.39 |
| 3,167,671 A | | 1/1965 | Staak | |
| 3,546,930 A | * | 12/1970 | Flarsheim | 74/424.9 |
| 3,654,816 A | * | 4/1972 | Beery et al. | 74/424.75 |
| 4,227,426 A | * | 10/1980 | Schwanz et al. | 74/424.77 |
| 4,274,294 A | * | 6/1981 | Siryj et al. | 74/424.95 |
| 4,395,924 A | * | 8/1983 | Callahan | 74/424.74 |
| 5,079,963 A | * | 1/1992 | Yamamoto et al. | 74/424.75 |
| 5,533,417 A | | 7/1996 | Devenyi | |
| 5,636,549 A | * | 6/1997 | Devenyi | 74/424.75 |
| 6,459,844 B1 | * | 10/2002 | Pan | 385/140 |
| 6,513,403 B2 | | 2/2003 | Yatskov | |
| 6,726,568 B2 | | 4/2004 | Tanaka | |

* cited by examiner

*Primary Examiner*—Richard Ridley
*Assistant Examiner*—James Pilkington
(74) *Attorney, Agent, or Firm*—H. Saint St. Julian; John J. Horn

(57) ABSTRACT

A leadscrew assembly includes a leadscrew having an elongated shaft with an outer lateral surface and a rotational axis, and a leadscrew thread formed of a thread wire helically wrapped in spaced-apart turns upon the lateral surface and affixed to the elongated shaft. A hollow drive nut housing includes a nut bore having an unthreaded inner surface. The leadscrew is inserted through the nut bore. The nut bore is sized such that the leadscrew may rotate therein about the rotational axis. A spring pin is affixed to the drive nut housing and spans across the nut bore to engage the leadscrew thread.

14 Claims, 2 Drawing Sheets

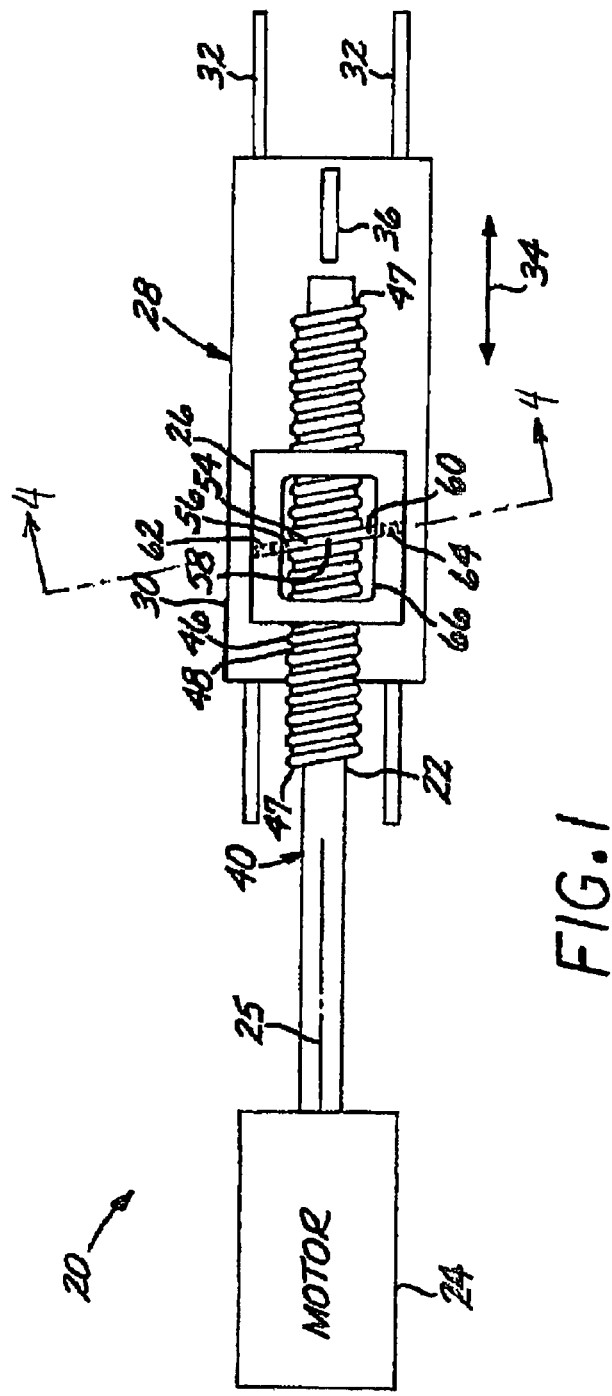
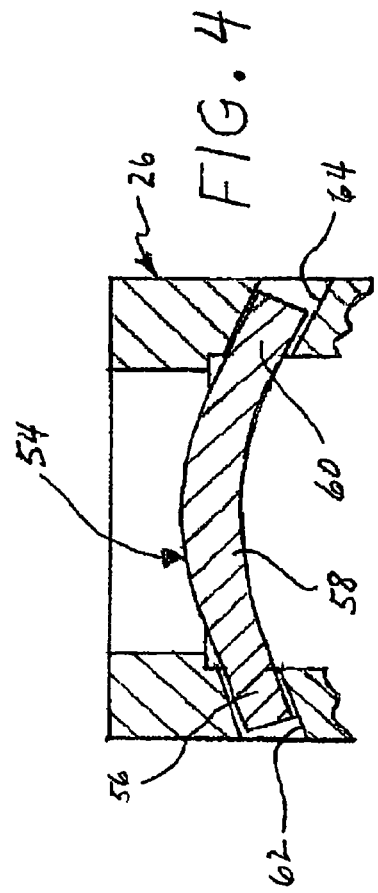

LEADSCREW ASSEMBLY WITH A WIRE-WOUND LEADSCREW AND A SPRING-PIN ENGAGEMENT OF A DRIVE NUT TO THE LEADSCREW

BACKGROUND OF THE INVENTION

This invention relates to a mechanical movement to translate rotational to linear motion and, more particularly, to an inexpensive leadscrew linear-movement assembly.

Electric motors commonly produce a rotational output, but many mechanisms require a linear movement driven by the motor. A leadscrew assembly is one approach for translating the rotational movement of the motor to the required linear movement. In the conventional leadscrew assembly, the thread of an externally threaded leadscrew engages a recirculating ball nut structure, which in turn is engaged to the structure to be driven linearly. As the leadscrew turns, the ball nut structure and the driven structure move linearly.

This conventional leadscrew assembly is relatively expensive to produce due to the precision machining required. It is also limited to relatively large-size devices and coarse thread pitches because of the size of the balls used in the recirculating ball nut structure. The conventional leadscrew assembly may also be subject to excessive wear of the threads, particularly if there is any misalignment.

An advance in overcoming these disadvantages is described in U.S. Pat. No. 5,636,549, whose disclosure is incorporated by reference. The '549 patent discloses a leadscrew in which the thread structure is defined by a wire wound helically around a cylindrical form. A leadscrew-nut assembly is also disclosed for engaging the leadscrew to the linear slide assembly.

The approach of the '549 patent is operable for many applications but is not optimal for other applications such as those requiring light duty, low loads, and low speeds of operation. There is a need for realizing the advantages of the basic approach disclosed in the '549 patent, but in a form more suitable to these other applications. The present invention fulfills this need, and further provides related advantages.

SUMMARY OF THE INVENTION

The present invention provides a leadscrew assembly that is particularly suitable for light-duty applications wherein the loads and speeds of movement are small to moderate in magnitude. It is tolerant of misalignments and is preloaded to avoid backlash and play in the system when the direction of movement is reversed. The leadscrew assembly may be scaled over a wide range of sizes, but is most desirably applied in small-size applications. The leadscrew assembly is inexpensive to produce.

In accordance with the invention, a leadscrew assembly comprises a leadscrew comprising an elongated shaft having an outer lateral surface and a rotational axis, and a leadscrew thread comprising a thread wire helically wrapped in spaced-apart turns upon the lateral surface and affixed to the elongated shaft. A hollow drive nut housing comprises a nut bore having an unthreaded inner surface with the leadscrew being inserted through the nut bore. The nut bore is sized such that the leadscrew may rotate therein about the rotational axis. A spring pin is affixed to the drive nut housing and spans across the nut bore to engage the leadscrew thread.

The leadscrew may further comprise a spacer wire having a size smaller than that of the thread wire and helically interwrapped about the elongated shaft with the thread wire. The spacer wire holds the thread wire in the proper pitch and spacing. The elongated shaft is preferably cylindrical but may be of other shapes as well. The thread wire preferably has a circular cross section.

The spring pin has a first end, a central portion, and a second end. It is preferred that the first end and the second end are each affixed to the drive nut housing. In one embodiment, the drive nut housing has a first spring pin retainer therein and an oppositely disposed second spring pin retainer therein. The first spring pin retainer and the second spring pin retainer each comprise openings in the drive nut housing. The first spring pin retainer receives the first end of the spring pin therein and the second spring pin retainer receives the second end of the spring pin therein. The central portion of the spring pin extends in an arc and spans across an interior of the nut bore to engage the leadscrew thread. The drive nut housing may have an access opening therethrough, through which the spring pin is accessible from an exterior of the drive nut housing and providing clearance for the spring pin.

The assembly typically further includes a motor that rotationally drives the leadscrew, and a linear slide mechanism to which the drive nut housing is engaged. In an embodiment of particular interest, an optical filter is supported on the linear slide mechanism, so that the optical filter is movable by a rotation of the leadscrew.

The leadscrew assembly of the '549 patent is widely operable. However, for some applications, the leadscrew-nut assembly of the '549 patent provides more strength and movement capability than is needed, with a correspondingly greater mechanical complexity and cost than are necessary. In the present leadscrew assembly, the drive nut housing has no internal threading. The interconnection to the drive nut housing is accomplished with the spring pin bridging across the nut bore of the drive nut housing. The spring pin thus serves the function of the female thread to which the male thread of the leadscrew is engaged, and also serves as the preloading device to ensure a smooth operation of the leadscrew assembly in both movement directions and upon reversal of the movement direction. The engagement of the leadscrew to the drive nut housing is achieved with two rounded surfaces (the thread wire and the spring pin) contacting each other, minimizing their mutual wear.

Although a particular embodiment of the invention has been described in detail for purposes of illustration, various modifications and enhancements may be made without departing from the spirit and scope of the invention. Accordingly, the invention is not to be limited except as by the appended claims.

BRIEF DESCRIPTION OF THE DRAWINGS

FIG. 1 is a plan view of a leadscrew assembly;

FIG. 4 is an enlarged, partial sectional view taken along line 4-4 of FIG. 1.

DETAILED DESCRIPTION OF THE INVENTION

Figure 2:
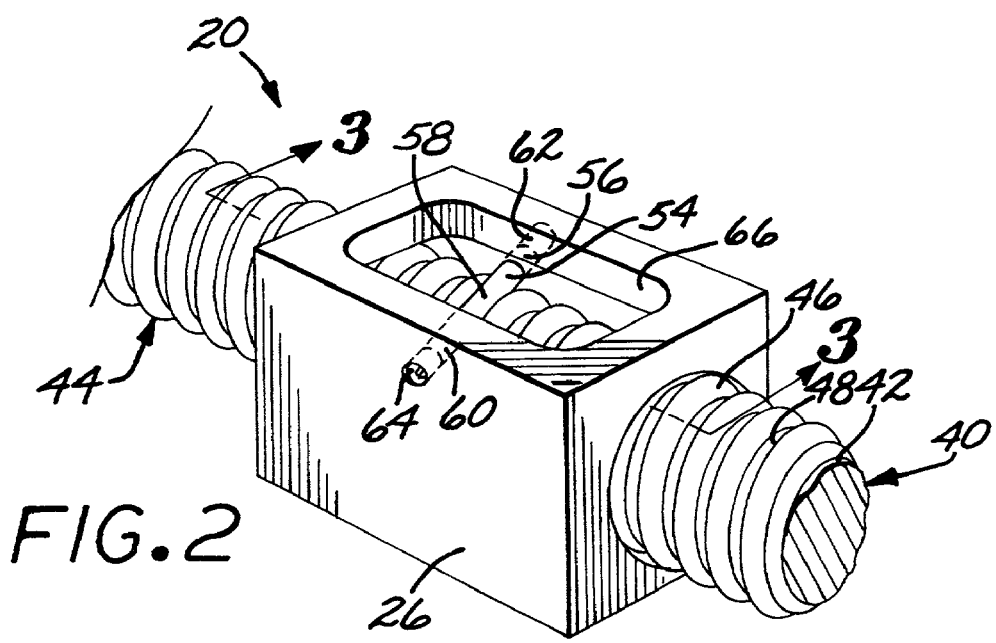
FIG. 2 is a perspective detail view of the leadscrew and drive nut housing.

FIG. 1 depicts a leadscrew assembly 20 including a leadscrew 22 driven by a motor 24, such as a miniature stepper motor, having a rotational power output about a rotational axis 25. The leadscrew 22 engages a hollow drive nut housing 26 that is affixed to a linear slide mechanism 28 so that the drive nut housing 26 does not rotate. The linear slide mechanism 28 includes a slider 30 mounted on rails 32 to move linearly parallel to a linear movement direction 34. A supported object, in the illustrated case an optical filter 36, is supported on the slider 30. Rotary motion of the power output of the motor 24 introduced into the leadscrew 22 is thereby translated into a linear movement of the optical filter 36 parallel to the linear movement direction 34.

Figure 3:
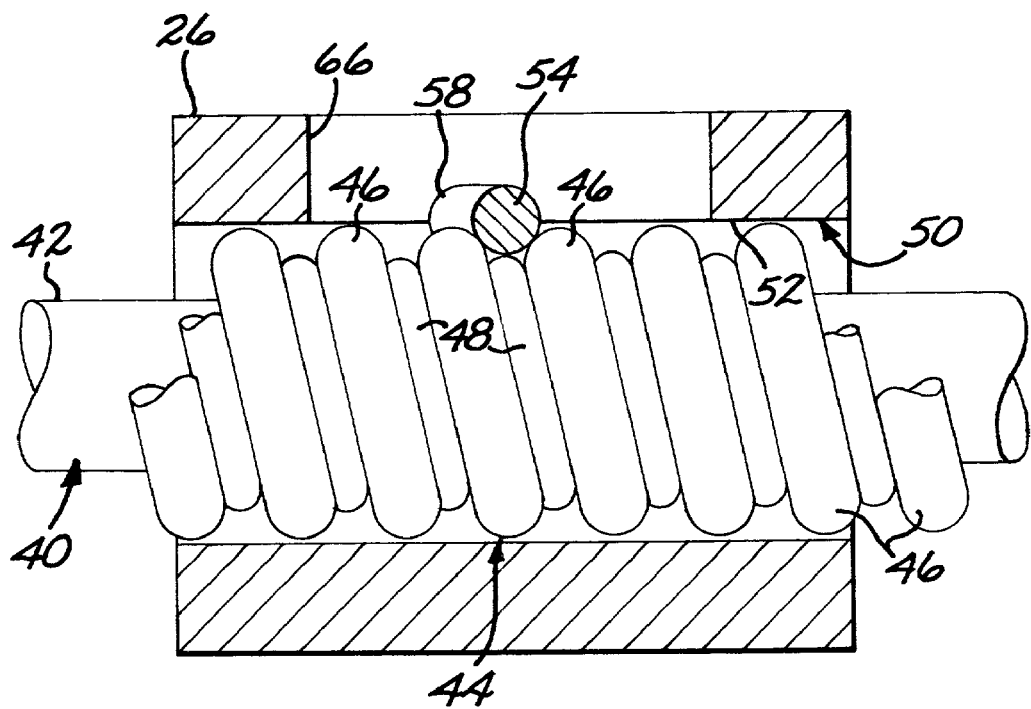
FIG. 3 is a sectional view of the leadscrew and drive nut housing, taken on line 3-3 of FIG. 2.

FIGS. 2-3 illustrates the leadscrew 22 and drive nut housing 26 in greater detail. The leadscrew 22 comprises an elongated shaft 40 having an outer lateral surface 42 and the rotational axis 25. The shaft 40 is preferably cylindrical, and the rotational axis 25 coincides with the cylindrical axis of the shaft 40.

A leadscrew thread 44 is formed by a thread wire 46 helically wrapped in spaced-apart turns upon the lateral surface 42 of the shaft 40. The thread wire 46 is affixed at its ends 47 (and optionally at other locations as well) to the elongated shaft 40. The thread wire 46 is preferably circular when viewed in a cross section taken perpendicular to its axis of elongation. Preferably, the leadscrew 22 further comprises a spacer wire 48 having a size smaller than that of the thread wire 46 and helically interwrapped about the elongated shaft 40 with the thread wire 46. The wires 46 and 48 are wrapped in alternating turns with the adjacent turns contacting each other. The spacer wire 48 thus defines the spacing between the turns of the thread wire 46 and holds those turns at the proper spacing measured parallel to the rotational axis 25, but does not interfere with the engagement of the thread wire 46 to the drive nut housing 26, as described next.

The drive nut housing 26 is hollow with a nut bore 50 therethrough having an unthreaded inner surface 52. (That is, the inner surface 52 is not threaded so as to engage the leadscrew thread 44). The leadscrew 22 is inserted through the nut bore 50. The nut bore 50 is sized such that the leadscrew 22 may rotate therein about the rotational axis 25.

A spring pin 54 is affixed at its ends to the drive nut housing 26 and spans across the nut bore 50 in an arc. The spring pin 54 lies between and engages two adjacent turns of the leadscrew thread 44, as best seen in FIG. 3. The spring pin 54 thus functions in the manner of a portion of a single turn of a female thread of the drive nut housing 26. The drive force of the turning of the leadscrew 22 about its rotational axis 25 is transmitted into the drive nut housing 26 and thence into the slider 30 by the sliding contact between the adjacent turns of the thread wire 46 and the spring pin 54. Since the thread wire 46 and the spring pin 54 are both of a rounded shape and may be made of a relatively hard material such as spring steel, the mutual wear experienced by these two elements as the leadscrew 22 turns is relatively small.

Referring now to FIGS. 1-4, the spring pin 54 has a first end 56, a central portion 58, and a second end 60. The first end 56 and the second end 60 are each affixed to the drive nut housing 26 so that the central portion 58 spans across the nut bore 50 in an arced shape. It is the arced central portion 58 that is seen in FIGS. 3 and 4, and engages the adjacent turns of the thread wire 46. The drive nut housing has a first spring pin retainer 62 and a second oppositely disposed spring pin retainer 64, ("Oppositely disposed" means that the two retainers 62 and 64 are on opposite sides of the drive nut housing 26 to the extent that the arced central portion 58 may span across the nut bore 50 and engage the adjacent turns of the thread wire 46. The two retainers 62 and 64 need not be diametrically opposed across the nut bore 50.) The first spring pin retainer 62 and the second spring pin retainer 64 are preferably each openings in the wall of the drive nut housing 26, with the respective first end 56 and the second end 60 inserted into and received within the openings. The first spring pin retainer 62 receives the first end 56 of the spring pin 54 therein, and the second spring pin retainer 64 receives the second end 60 of the spring pin 54 therein.

Because the spring pin 54 is bent and under a bending force so that it contacts the adjacent turns of the leadscrew thread 44, the spring pin 54 applies a preload to the adjacent turns of the leadscrew thread 44 of the leadscrew 22. This preload ensures a positive contact between the spring pin 54 and the leadscrew thread 44, and eliminates "play" in the mechanical engagement and backlash when the rotational direction of the leadscrew 22 is reversed. The preload and springy engagement between the leadscrew 22 and the drive nut housing 26 also arrest vibration produced by the motor 24, which may otherwise be transmitted to the optical filter 36 or other supported structure.

The drive nut housing 26 preferably has an access opening 66 therethrough. The access opening 66 provides access to the spring pin 54 from an exterior of the drive nut housing 26. The access opening 66 also provides the clearance for the arced central portion 58 of the spring pin 54 that would otherwise not be available within the nut bore 50.

In operation of the lead screw assembly 20, the motor 24 turns the leadscrew 22 so that the thread wire 46 rotates. The spring pin 54, which is engaged to the thread wire 46 (that is, between two adjacent turns of the thread wire 46) slides over the thread wire 46 to create a linear motion of the drive nut housing 26 and thence the slider 30 parallel to the movement direction 34. The supported object, here the optical filter 36, is thereby moved parallel to the movement direction 34.

The leadscrew assembly 20 is of relatively low cost, inasmuch as there is no precision machining of threads, either male threads on the leadscrew 22 or female threads on the inner surface 52 of the nut bore 50. The elements that function as threads are lengths of wire positioned as described above. The leadscrew assembly 20 is therefore amenable to mass production techniques. For this reason and because there is no recirculating ball mechanism, the leadscrew assembly 20 may be scaled to large or small sizes.

The leadscrew assembly 20 is also highly tolerant of slight misalignments. As may be visualized from FIG. 3, slight misalignments of the leadscrew 22 and the drive nut housing 26 do not interfere with the engagement of the thread wire 46 and the spring pin 54. Conventional leadscrew assemblies are much less tolerant of misalignments, because two threads must engage precisely to each other.

Several small-scale prototypes of the leadscrew assembly have been constructed and driven by a small stepper motor to move an optical filter in a fiber optic device. These prototypes were tested and found to operate as described herein in light-duty applications.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A motion transmission apparatus comprising:
   a elongated shaft having an outer surface;
   a thread wire helically wrapped in spaced-apart turns upon the outer surface of the shaft;
   a housing having an unthreaded bore for receiving the wire wrapped shaft and for enabling relative rotation between the shaft and the housing, the housing including pin receiving openings; and
   a spring pin having first and second ends and an arc-shaped central portion, the first and second ends being received by and retained in the openings of the housing, and the central portion engages and biases the thread wire wrapped on the shaft.

2. The apparatus of claim 1, including
a spacer wire having a size smaller than that of the thread wire and helically interwrapped about the elongated shaft with the thread wire.

3. The apparatus of claim 1, wherein the elongated shaft is cylindrical.

4. The apparatus of claim 1, wherein thread wire has a circular cross section.

5. The apparatus of claim 1, wherein the housing includes an opening for enabling access to the spring wire and for enabling spring wire clearance.

6. The apparatus of claim 1, further including a motor for rotationally driving the wire wrapped shaft.

7. The apparatus of claim 1, including a linear slide mechanism connected to the housing.

8. The apparatus of claim 7, further including an optical filter supported on the linear slide mechanism.

9. The apparatus of claim 1, wherein
the spring pin contacts the wrapped thread wire over a portion of a single turn.

10. The apparatus of claim 1, wherein
the spring pin is biased toward the thread wire to ensure a positive contact between the spring pin and the thread wire.

11. A motion transmission apparatus comprising:
a cylindrical shaft having an outer surface and a rotational axis;
a thread wire helically wrapped in spaced-apart turns upon the outer surface of the shaft, the thread wire having a circular cross section;
a spacer wire having a size smaller than that of the thread wire and helically interwrapped about the shaft with the spacer wire defining a spacing between turns of the thread wire;
a housing having an unthreaded inner bore for receiving the wire wrapped shaft, the bore being sized to enable rotation of the wire wrapped shaft about the rotational axis, and the housing including wire receiving openings in side walls;
a spring pin affixed to the housing and spanning the bore to engage the thread wire, wherein the spring pin has a first end, a central portion, and a second end, the first and second ends being received by and retained in the wall openings of the housing, and the central portion of the spring pin extending in an arc across the bore to engage and bias the thread wire; and
a linear slide mechanism to which the housing is affixed.

12. The apparatus of claim 11, wherein
the housing has an access opening for enabling access to the spring pin from an exterior of the housing and for providing clearance for the spring pin.

13. The apparatus of claim 11, further including
a motor that rotationally drives the wire wrapped shaft about the rotational axis.

14. The apparatus of claim 11, further including
an optical filter supported on the linear slide mechanism.

* * * * *